US010956400B2

(12) United States Patent
Feiks et al.

(10) Patent No.: US 10,956,400 B2
(45) Date of Patent: Mar. 23, 2021

(54) QUERY PROCESSING USING PRIMARY DATA VERSIONING AND SECONDARY DATA

(71) Applicant: SAP SE, Walldorf (DE)

(72) Inventors: Frank Feiks, Heidelberg (DE); Thomas Gross-Boelting, Walldorf (DE); Michael Mueller, Heidelberg (DE); Armin Weidenschlager, Muehlhausen (DE); Anton Forstreuter, Heidelberg (DE); Xiaomeng Wang, Wiesloch (DE); Florian Roeger, Heidelberg (DE); Jordan Tchorbadjiyski, Mannheim (DE); Ruadhan MacFadden, Heidelberg (DE)

(73) Assignee: SAP SE, Walldorf (DE)

( * ) Notice: Subject to any disclaimer, the term of this patent is extended or adjusted under 35 U.S.C. 154(b) by 1060 days.

(21) Appl. No.: 15/211,817

(22) Filed: Jul. 15, 2016

(65) Prior Publication Data

US 2018/0018370 A1 Jan. 18, 2018

(51) Int. Cl.
*G06F 16/23* (2019.01)
(52) U.S. Cl.
CPC ................. *G06F 16/2365* (2019.01)
(58) Field of Classification Search
None
See application file for complete search history.

(56) References Cited

U.S. PATENT DOCUMENTS 6,643,640 B1 * 11/2003 Getchius ............ G06Q 30/00
707/719

7,769,722 B1 * 8/2010 Bergant ............. G06F 16/184
707/681
8,438,140 B2 * 5/2013 Polo-Malouvier .... G06F 16/283
707/694
8,473,515 B2 * 6/2013 Cotner ............. G06F 16/256
707/782
9,069,788 B2 * 6/2015 Dutta ............. G06F 16/215
9,081,805 B1 * 7/2015 Stamen ............. G06F 16/86
9,218,376 B2 * 12/2015 Muller ............. G06F 11/1464
2004/0143811 A1 7/2004 Kaelicke et al.
2006/0085299 A1 4/2006 Goll et al.
2006/0271420 A1 11/2006 Anselmann et al.
(Continued)

OTHER PUBLICATIONS

ABAP for SAP HANA, "Code Push Down for HANA Starts with ABAP Open SQL," retrieved from http://scn.sap.com/community/abap/hana/blog/2014/09/26/code-push-do on Apr. 29, 2016, 3 pages.
Coding Horror, A Visual Explanation of SQL Joins, retrieved from https://blog.codinghorror.com/a-visual-explanation-of-sql-joins/ on Apr. 29, 2016, 6 pages.

(Continued)

*Primary Examiner* — Ashish Thomas
*Assistant Examiner* — Mellissa M. Ohba
(74) *Attorney, Agent, or Firm* — Klarquist Sparkman, LLP

(57) ABSTRACT

Querying a data set formed from a version of primary data and secondary data is facilitated. First and second versions of primary data are stored in a primary data version store. Secondary data is received. The secondary data is stored in a secondary data store. A query language statement is received. The query language statement is executed by selecting query results from a data set that includes the secondary data and elements of the first version of primary data not inconsistent with the secondary data.

20 Claims, 10 Drawing Sheets

(56) References Cited

U.S. PATENT DOCUMENTS

| | | | |
|---|---|---|---|
| 2007/0050233 A1 | 3/2007 | Doerfler et al. | |
| 2007/0220140 A1 | 9/2007 | Weidenschlager | |
| 2008/0162164 A1 | 7/2008 | Segler et al. | |
| 2009/0043638 A1 | 5/2009 | Wilking et al. | |
| 2009/0171736 A1 | 7/2009 | Segler et al. | |
| 2010/0063959 A1* | 3/2010 | Doshi | G06F 16/27 707/618 |
| 2010/0070337 A1 | 3/2010 | Poth et al. | |
| 2010/0138276 A1 | 6/2010 | Bildmayer et al. | |
| 2010/0161364 A1 | 6/2010 | Lokowandt et al. | |
| 2011/0173203 A1 | 7/2011 | Jung et al. | |
| 2011/0173220 A1 | 7/2011 | Jung et al. | |
| 2011/0295839 A1* | 12/2011 | Collins | G06F 16/2428 707/716 |
| 2013/0007062 A1* | 1/2013 | Dutta | G06F 16/215 707/792 |
| 2013/0046579 A1 | 2/2013 | Feiks | |
| 2013/0054437 A1 | 2/2013 | Mueller et al. | |
| 2013/0173669 A1* | 7/2013 | Tang | G06F 16/211 707/803 |
| 2014/0122411 A1 | 5/2014 | Teichmann et al. | |
| 2014/0143734 A1 | 5/2014 | Jann et al. | |
| 2014/0149450 A1 | 5/2014 | Seufert et al. | |
| 2014/0372368 A1 | 12/2014 | Schroetel et al. | |
| 2014/0379754 A1 | 12/2014 | Dipper et al. | |
| 2015/0120809 A1 | 4/2015 | Braemer et al. | |
| 2016/0105504 A1* | 4/2016 | Vallabhaneni | H04L 67/1095 709/217 |

OTHER PUBLICATIONS

Petrusel, "Making Decision Process Knowledge Explicit Using the Decision Data Model," *International Conference on Business Information Systems*, vol. 87, pp. 172-184, 2011.

SAP HANA Developer Center, "When I traveled through time using SAP HANA!!" retrieved from http://scn.sap.com/community/developer-center/hana/blog/2013/02/12/ on Apr. 29, 2016, 14 pages.

Sharma, Nirmal Kumar, "Management Information System," IJMIE, vol. 2, No. 8, pp. 553-570, 2012.

SQL with Manoj, "SQL Server (TSQL) Programming, DB concepts, Tips & Tricks with >350 articles . . . comments welcome!!!" retrieved from https://sqlwithmanoj.com/2009/03/12/sql-server-joins-and-types/ on Apr. 29, 2016, 12 pages.

Stenger, Tod, "Integrated Business Planning Overview and Preview of the New Demand Application," retrieved from https://www.asug.com/discussions/servlet/JiveServlet/previewBody/41517-102-1-60821/292%20Integrated%20Business%20Planning%20Overview%20and%20Preview%20of%20the%20New%20Demand%20Application.pdf, 2015, 55 pages.

The Best-Run Businesses Run SAP, "CDS View Building," retrieved from https://help.sap.com/saphelp_nw74/helpdata/de/4e/d1f2e06e391014adc9f on May 10, 2016.

The Best-Run Businesses Run SAP, "Database Views," retrieved from https://help.sap.com/saphelp_erp60_sp/helpdata/en/cf/21ecab446011d18 on May 10, 2016, 2 pages.

The Best-Run Businesses Run SAP, "Running Simulations," retrieved from http://help.sap.com/saphelp_ibp61/helpdata/en/3f/b20a56118f210de100 on Apr. 29, 2016, 3 pages.

\* cited by examiner

QUERY PROCESSING USING PRIMARY DATA VERSIONING AND SECONDARY DATA

FIELD

The present disclosure generally relates to processing data in a database, such as performing queries. Particular implementations relate to performing queries on a simulation data set produced by combining a specified version of primary data with secondary data.

BACKGROUND

Databases are commonly used in enterprise resource planning (ERP) applications, where organizations collect data related to the enterprise, including information related to supply of materials, product planning, purchasing, manufacturing, shipping, inventory, marketing, and sales. The collected data can be used for a variety of purposes, including determining whether an organization can take certain actions, or how to take actions in an optimized manner.

Planning operations can include performing hypothetical analyses of various scenarios, such as determining whether an order can be fulfilled, how best to fulfill the order, or if the order, for example, will require the purchase of additional materials or increased staffing. The planning operations can depend on many different underlying values. Those values may be subject to frequent updates, which can complicate the planning process. For example, data can change during the planning, which might cause inconsistencies between various calculation steps, if different values are used in different calculations. Similarly, the results from adjustments to the plan can be difficult to compare with prior results, if the underlying values are subject to change.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating data processing, such as executing a query on a combination of a version of primary data and secondary data. According to a particular method, a first version of primary data is stored in a primary data version store for a plurality of database records. A second version of primary data is stored in the primary data version store. The second version of primary data includes second version primary data for a least a portion of the plurality of database records.

Secondary data is received, such as from a user. The secondary data is stored in a secondary data store. A query language statement is received. The query language statement is executed by selecting query results from a combined data set that includes the secondary data and data elements of the first version of primary data not inconsistent with the secondary data. In some cases, the selecting can be carried out by determining primary key values of the secondary data and not selecting for the combined data set, data of the first version of primary data having the determined primary key values.

The method can include additional steps. For example, the method can include receiving the first or second versions of primary data, such as from a primary data store. The method can also include storing the association between the base primary data version identifier and the secondary data, such as in a metadata store. Data in the primary data version store or secondary data store can be periodically removed, such as when the data has not been used for a period of time, or the data is older than a certain age.

In further implementations, the method can include associating version identifiers with the first and second versions of primary data. A version identifier may also be associated with the first secondary data. A base primary data version identifier may be associated with the first secondary version identifier. The query language statement can be associated with the first secondary data identifier. In executing the query, the first base primary data version identifier can indicate the data elements of the first version of the primary data.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Data, such as maintained in a database, can be used for a variety of purposes, including for planning activities. For example, a user may wish to analyze the potential consequences of taking (or not taking) certain actions based on a given set of conditions represented by the data. The data, in some examples, can represent the state of information associated with the operation of a business.

In particular implementations, the data can be used for supply chain management applications. A user may wish to determine whether a particular order can be filled, or the best way of filling the order. Making this determination can involve analyzing the current inventory of a product, or materials needed to produce the product, staffing needed to produce or transport the product, and potential impacts on other activities of the business, such as impacts on other orders or profitability. These types of hypothetical analyses can be referred to as plans or simulations.

Figure 1:
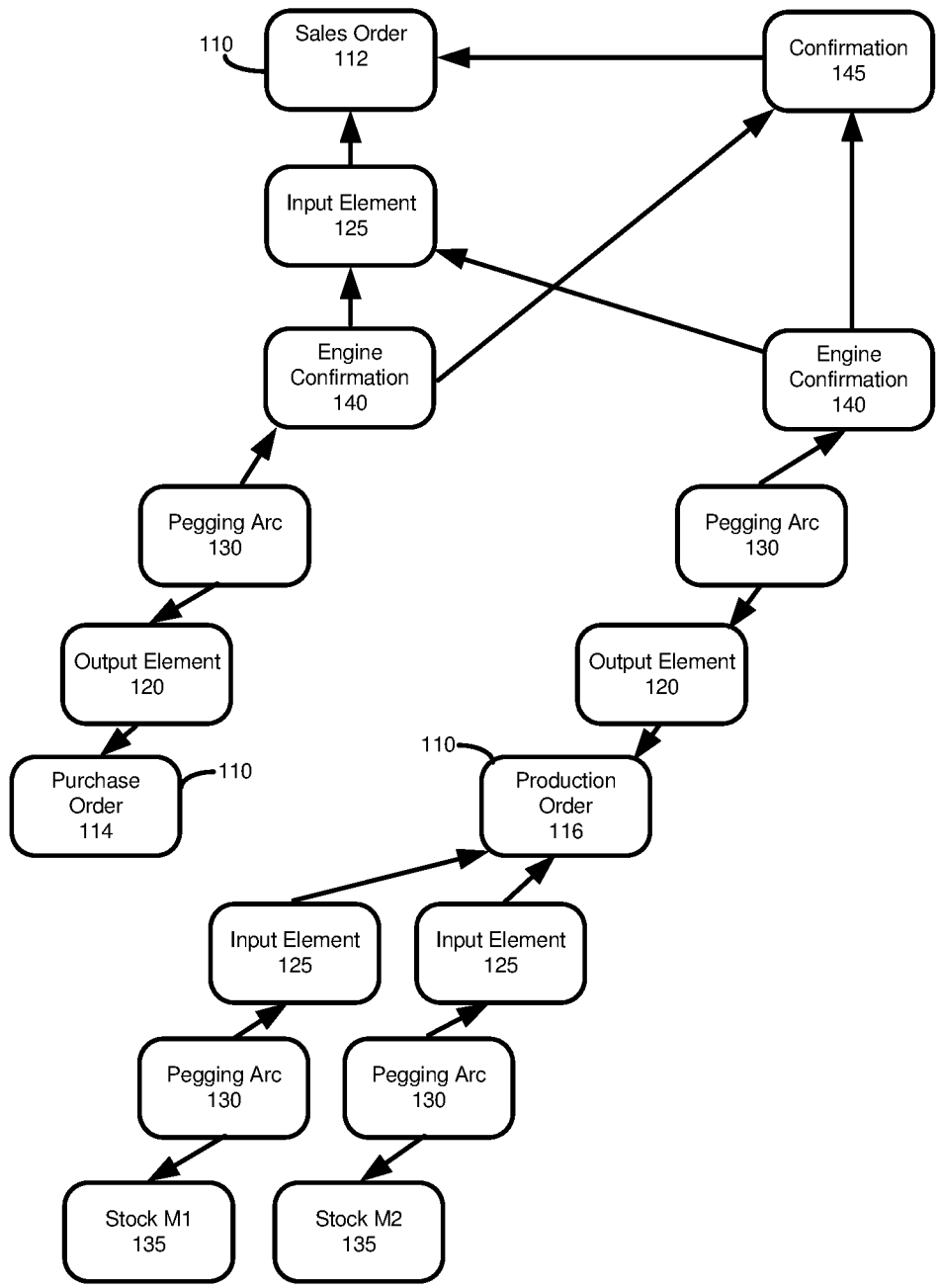
FIG. 1 is a diagram illustrating the relationship between an input and an output used in fulfilling a request, and queries that may be made relating to the request.

FIG. 1 is a diagram illustrating various orders 110 and related objects. FIG. 1 can represent the modelling of a sales order 112 along with the orders planned to fulfill it, such as a purchase order 114 and a production order 116. An order 110 typically includes order information, and may include one or more output elements 120, or one or more input elements 125. The order information can describe what kind of processing is planned or associated with the order 110, when it should take place, and what production facilities are involved in fulfilling or carrying out the order. Output elements 120 can describe the product available after this processing step, while input elements 125 can describe the raw materials or intermediate products used to produce it.

Relations 130, which can be referred to as pegging arcs, can be used to relate input elements 125 and output elements 120. Once a chain of orders 110 can be established, and all requirements are satisfied via stock 135, or purchasing from a third party, the planned quantity of products and the availability date can be confirmed, such as to a customer, through notifications 140, 145.

In FIG. 1, the direction of the arrows can indicate a relationship between the objects (110, 120, 125, 130, 135, 140, 145). For example, an input element 125 can belong to a request 110. Each type of object can be associated with its own primary data store and secondary data store, as further described below.

A user may issue various queries regarding a request 110, or otherwise relating to the objects in FIG. 1. For example, a user may wish to perform an output query to see the amount of output elements 120 on hand available to fulfill requests 110. A capacity query can be selected to determine, for example, how many outputs elements 120 could be produced based on a current inventory of input elements 125. A user may wish to run a forecast query, or simulation, to investigate potential outcomes resulting from changing one or more of the objects of FIG. 1. For example, a user may wish to determine the effect on a request 110 if a second request was also fulfilled. A user may wish to investigate whether a request 110 could be fulfilled if levels of the input elements 125 were to change, or if a relation 130 were altered. The user may wish to run other types of queries.

Organizations can use enterprise resource planning (ERP) computing systems to help collect, store, and analyze various types of data. ERP systems typically involve many types of data, and can be used concurrently by multiple users. While concurrent use can be advantageous in making data available to many users, and allowing data to be updated frequently, it can create issues in carrying out planning activities. For example, if underlying data for a simulation or plan changes during execution of simulation or planning operations, it can result in data inconsistencies. If a user wishes to carry out multiple simulations from a common baseline scenario, but changes some values used in the simulations, it can be difficult to separate differences resulting from the user-changed values from differences resulting from changes to the underlying data that may have occurred between execution of the simulations.

To try and overcome the potential problems in carrying out simulations when underlying data is subject to change, a prior approach has been to create a copy of data that might be needed for a simulation and to use the copied data as the basis for the simulation. However, this approach can have significant drawbacks. For example, creating a copy of the data can require a large amount of processor use, memory use, or data storage. If multiple users create simulations, a separate copy of the data may be required for each user, or each different simulation. It can be difficult to copy only a subset of the data without either restricting the user to particular data for the simulation, which can reduce the utility of the simulation, or running the risk that the user will try and access data that was not included in the copy. Similarly, if a large amount of data is to be included in the copy, it can be difficult to make the copy without the data changing during the time needed to complete the copying process.

Another approach to providing accurate simulations can be to create a separate, common data store that can be used for simulations. While a separate, common data store can help alleviate some of the problems noted above, such as making a copy of an entire data set when a simulation is to be performed, it can have other issues. For example, it can be difficult to keep information consistent between a primary data store (such as an ERP system) and a separate data store used for simulations. In addition, in at least some cases, the types of requests for database operations (such as queries) that can be conducted on the separate data store may be limited compared with the types of requests for database operations that can be executed on a primary data store.

The present disclosure can provide an improved method of executing simulations. Version data stores, such as tables, can be used to store data, including information regarding changes to the data that may have occurred. For example, if data in the version data store is changed, the change can be indicated by adding the changed data to the version data store along with one or more version identifiers associated with the change. The version identifier can, in at least some implementations, be a chronological identifier, such as a timestamp or other identifier, associated with the state of a database system. In some cases, when a simulation is initiated, the simulation can be associated with a base primary data version identifier. As the simulation is carried out, only primary data corresponding to the base primary data version identifier of the simulation is used in executing the simulation. In executing the simulation, secondary data associated with the simulation can be stored and merged with the primary data version data.

Example 2—Query Execution Using Primary Data Versioning and Secondary Data

Figure 2:
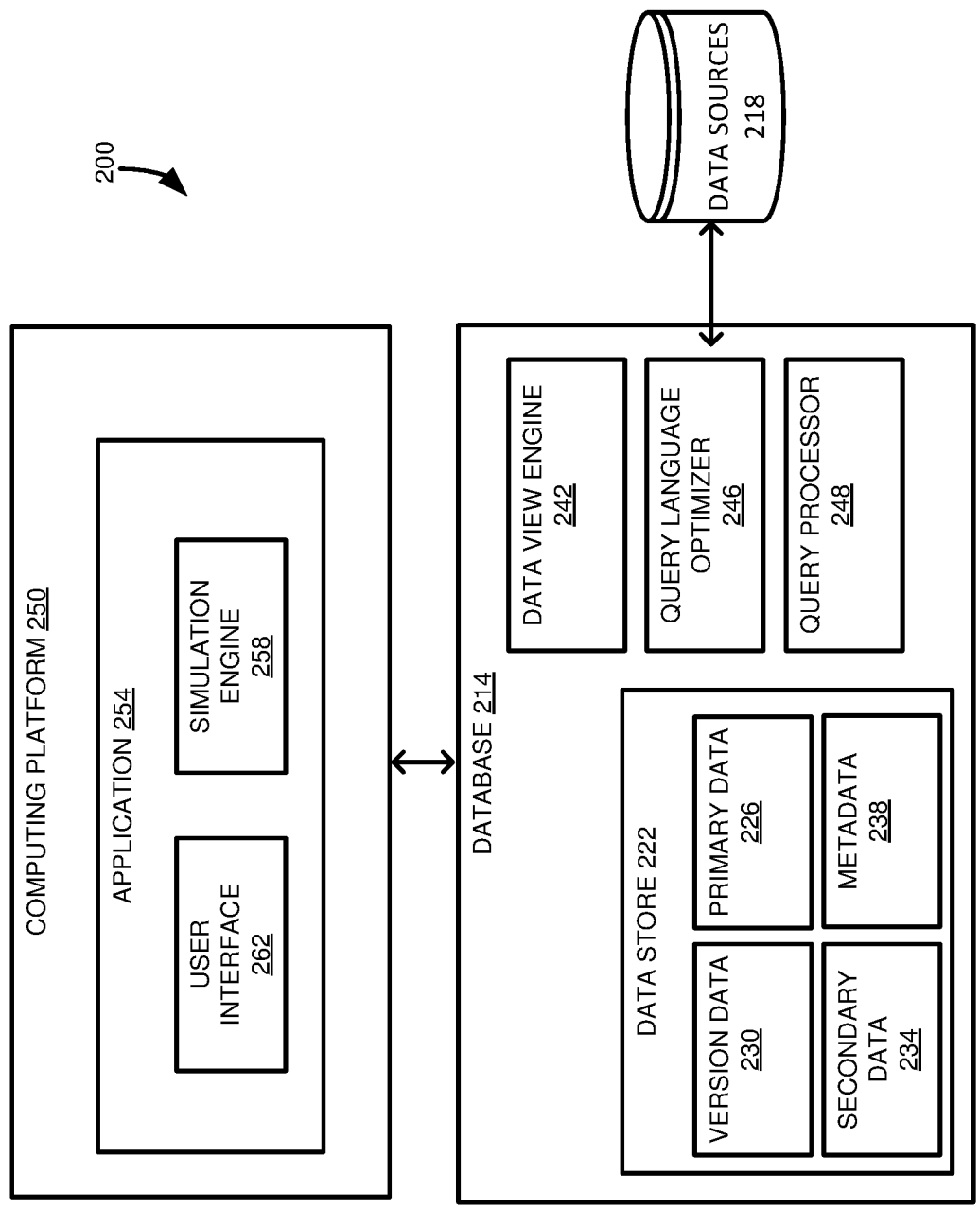
FIG. 2 is a block diagram illustrating an example software architecture in which a computing platform can communicate with a database to execute a request simulation.

FIG. 2 is a block diagram of an example software architecture 200 that can be used to provide simulations according to at least one embodiment of the present disclosure. The architecture 200 can include a database 214 (for example, the HANA database system of SAP SE of Walldorf, Germany). The database 214 can be in communication with one or more data sources 218. Data sources 218 can include, for example, client applications allowing users to submit requests for database operations to the database 214. The requests for database operations can include requests to add, modify, or delete data from the database 214. Data sources 218 can also include sources such as one or more data warehouses, one or more other database systems, or other data sources.

The data from the data sources 218 can be maintained in a primary data store 226 of a data store 222. In at least some implementations, the primary data store 226 can be a data store against which database write operations (such as SQL INSERT, UPDATE, or DELETE operations) are executed. For example, the primary data store 226 can be used to process OLTP (online transaction processing) requests from the data sources 218.

The data store 222 of the database 214 can further include a primary data version store 230. The primary data version store 230 can include all or a portion of the data in the primary data store 226. In at least some cases, the primary data version store 230 can include information not in the primary data store 226, such as old versions of primary data.

In particular examples, the primary data version store 230 is periodically updated to reflect changes to the primary data store 226. The primary data version store 230 typically contains multiple versions of data from the primary data store 226. For instance, a database record $R_1$ may have been created at a first time $T_1$, and then updated at a second time $T_2$. The primary data version store 230 can store a version of the database record $R_1$ at time $T_1$ and a version of record $R_1$ at time $T_2$, along with identifiers allowing a respective version to be accessed. In particular implementations, versions of database records may be periodically removed from the primary data version store 230.

A secondary data store 234 can be included in the database 214. The secondary data store 234 can be used to store data associated with simulations (or planning activities), such as those conducted by one or more users. The secondary data store 234 can associate each simulation with a particular identifier for the simulation.

Metadata associated with simulations can be stored in a metadata store 238. The metadata store 238 can store information related to simulations, such as a base primary data version identifier indicating a data version of the records of the primary data in the primary data version store 230 to be used with the particular simulation and, optionally, information such as a user or a client application associated with the simulation.

The database 214 can include a data view engine 242. The data view engine 242 can be used, for example, to produce an aggregation or visualization of data from the data store 222 and, optionally, other data sources. In some cases, data to be included in a view, such as to be provided to a user, can be distributed among multiple sources, such as multiple stores of the data store 222 and/or other data sources, or among multiple tables in one or more of the data stores of the data store 222 or other data sources. The data view engine 242 can be used to map data maintained in the data store 222 and/or other data sources to a definition for the view or representation.

A query language optimizer 246 can be included in the database 214. The query language optimizer 246 can be used to create (and optionally store or retrieve) an execution plan for a query language statement. For example, while a query language statement (such as a SQL statement) specifies information that data should contain, it may not describe how to carry out read and write operations associated with the statement. The query language optimizer 246 can determine appropriate operations to carry out the query language statement, including attempting to optimize the operations, such as in a query plan. The operations can be executed by a query processor 248.

The database system 214 can be in communication with a computing platform 250 (for example, the NETWEAVER platform of SAP SE of Walldorf, Germany). The computing platform 250 can include an application 254 that includes a simulation engine 258. The simulation engine 258 can receive user input through a user interface 262. In some cases, the user interface 262 can include a web services component, such as a component to send and receive information using the HTTP protocol. The user interface 262 can include, for example, an application server (such as a Java Enterprise Edition, Microsoft .NET, or ABAP application server) or an interpreter, such as for html, XML, or JSON data.

The user input can define simulation parameters to be executed by the simulation engine 258. The simulation engine 258 can generate and forward query language statements appropriate for the simulation to the database 214 to be executed by components of the database, including the data view engine 242, such as after being processed by the query language optimizer 246 and the query processor 248.

The architecture 200 may be structured other than as shown in FIG. 2. For example, various components can be combined, separated into additional components, or placed at other locations. In addition, at least certain components, such as the computing platform 250, can be omitted from, or other components can be included in, the architecture 200. For example, the database 214 can include the user interface 262 and the simulation engine 258.

Similarly, the database 214 may be structured in another manner Although the individual data stores 226, 230, 234, 238 are shown in a common data store 222, they may be stored in the database 214 in another manner. In addition, at least some of the data stores in the data store 222, such as the secondary data store 234 or the metadata store 238, can be stored other than in the database 214, such as being stored at the computing platform 250. In some cases, the computing platform 250 and the database 214 are located on different computing systems. In other cases, they can be located on the same computing system. Although the database 214 is shown as a unitary component, in at least some cases, the database 214 can be distributed among multiple computing systems, such as multiple nodes in a distributed database system.

While this Example 2 can be implemented in other manners, an advantage of at least certain features of the architecture 200 depicted in FIG. 2 is that it can leverage capabilities of the database system 214. For example, selection and merging of data can be carried out by the data view engine 242 and the query processor 248, rather than using (or solely using) the application 254 or computing platform 250. This arrangement can be more efficient, as the database 214 may have more processing capacity and faster access to data than the computing platform 250 or the application 254. In addition, in particular examples, the selection and merging of data can be carried out using query language statements (e.g., SQL statements), which can be simpler and more efficient to implement and execute than filtering and selecting data using a program written in a programming language such as C++.

Figure 3:
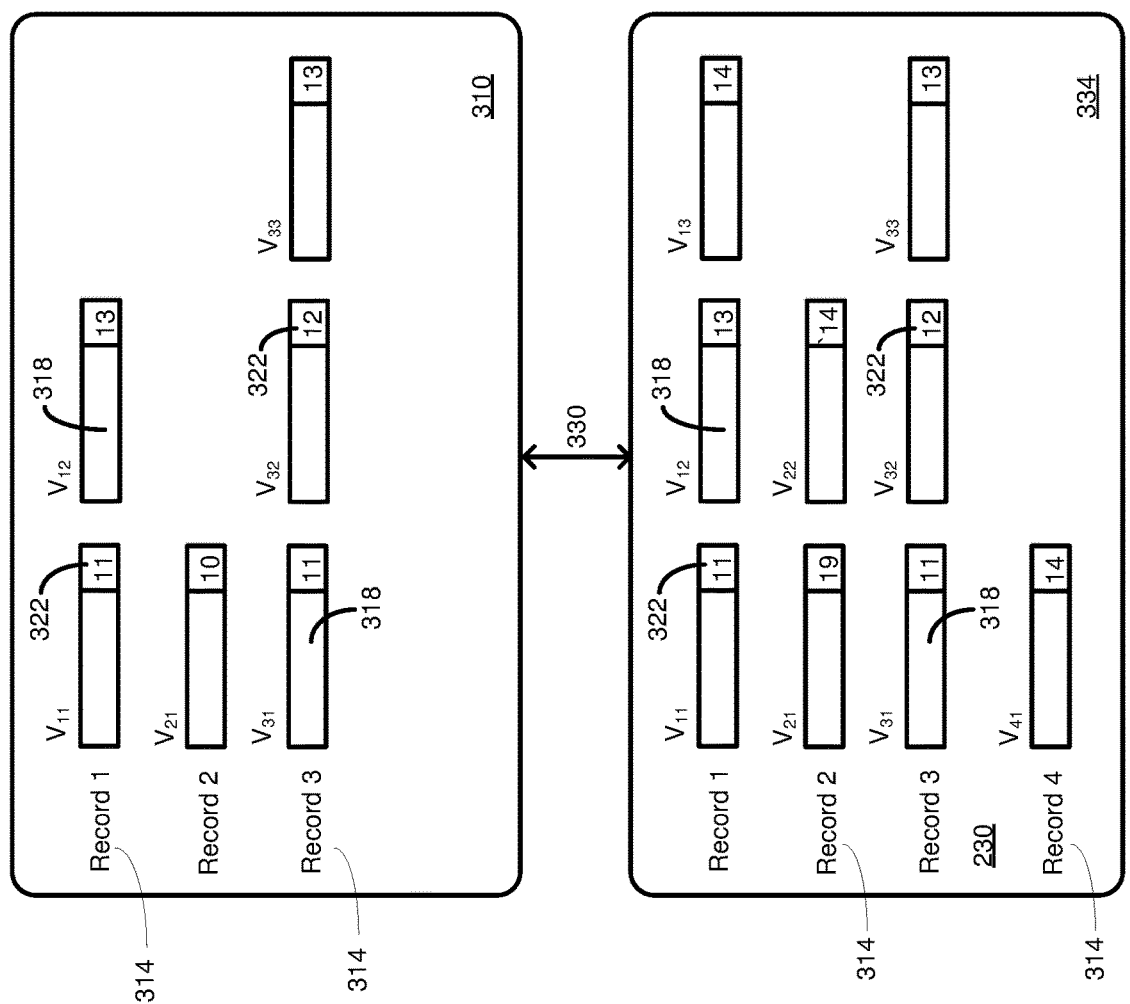
FIG. 3 is a diagram illustrating a primary data version store having one or more records, each record having one or more record versions, and updating the primary data version store with new record versions.

FIG. 3 is a diagram illustrating a particular implementation of the primary data version store 230 of FIG. 2, including how the primary data version store may be periodically updated using the primary data store 226. FIG. 3 illustrates a version table 310 at a first time point. The version table 310 includes a plurality of records 314, which may include one or more record versions 318. In at least some implementations, deletion of a record 314 can be indicated by creating a new record version 318, which can be empty, or otherwise marked to indicate that the record 314 has been deleted.

Each of the record versions 318 may be associated with a version identifier 322. In some cases, the version identifier 322 can be associated with a time the record 314 was created or modified in a primary data store. The version identifier 322, in particular implementations, can be a timestamp, such as a commit timestamp or a system timestamp. In other cases, the version identifier 322 can be different, such as being an identifier (e.g., a timestamp) associated with a time the version table 310 was updated against one or more primary data tables of the primary data store.

In a specific example, the version identifier 322 can be incremented each time an update process occurs, and the version identifier 322 assigned to any new record versions 318 acquired in the update. In another example, the version identifier 322 can represent a timestamp, such as a system timestamp or a global commit timestamp of a database system (such as the database 214 of FIG. 2) at the time the update occurred. In a yet further example, the version identifier 322 can be a maximum value of an identifier, such as a commit timestamp or a system timestamp, of all records included in an update to the version table 310.

The version identifiers 322 can, in particular implementations, be included in the records maintained by a primary data store (e.g., one or more tables in the primary data store 226 of FIG. 2). In such implementations, the version identifiers 322 can be copied or modified when the data is acquired by the version table 310. In other implementations, the primary data store does not include a version identifier, and may or may not maintain different record versions for a particular record.

Although FIG. 3 illustrates a single version identifier 322 for each record version 318, in other implementations, multiple version identifiers can be included for each record version. For example, the version identifiers 322 can indicate a timeframe for which the record version 318 is valid, such as a first time identifier (e.g., a "valid from" date or identifier) and a second time identifier (e.g., a "valid to" date or identifier).

FIG. 3 illustrates three records 314 for the version table 310. Record 1 has a version $V_{11}$ associated with a version identifier 11 and a second version $V_{12}$ associated with a version identifier of 13. Record 2 has a single version $V_{21}$ associated with a version identifier of 10. Record 3 is associated with three record versions, $V_{31}$, $V_{32}$, $V_{33}$, associated, respectively, with version identifiers of 11, 12, and 13. An update to the version table 310 occurs in process 330 to create an updated version table 334.

The updated version table 334 can maintain the record versions 318 of the version table 310, and can include additional record versions. For example, the updated version table 334 is shown as including new record versions $V_{13}$ for Record 1 and $V_{22}$ for Record 2. In addition, the updated version table 334 includes a new Record 4, having a version $V_{41}$. The new record versions $V_{13}$, $V_{22}$, and $V_{41}$ all have a version identifier of 14. However, as mentioned above, in some cases, record versions 318 included in an update 330 need not all be associated with the same version identifier 322.

Figure 4:
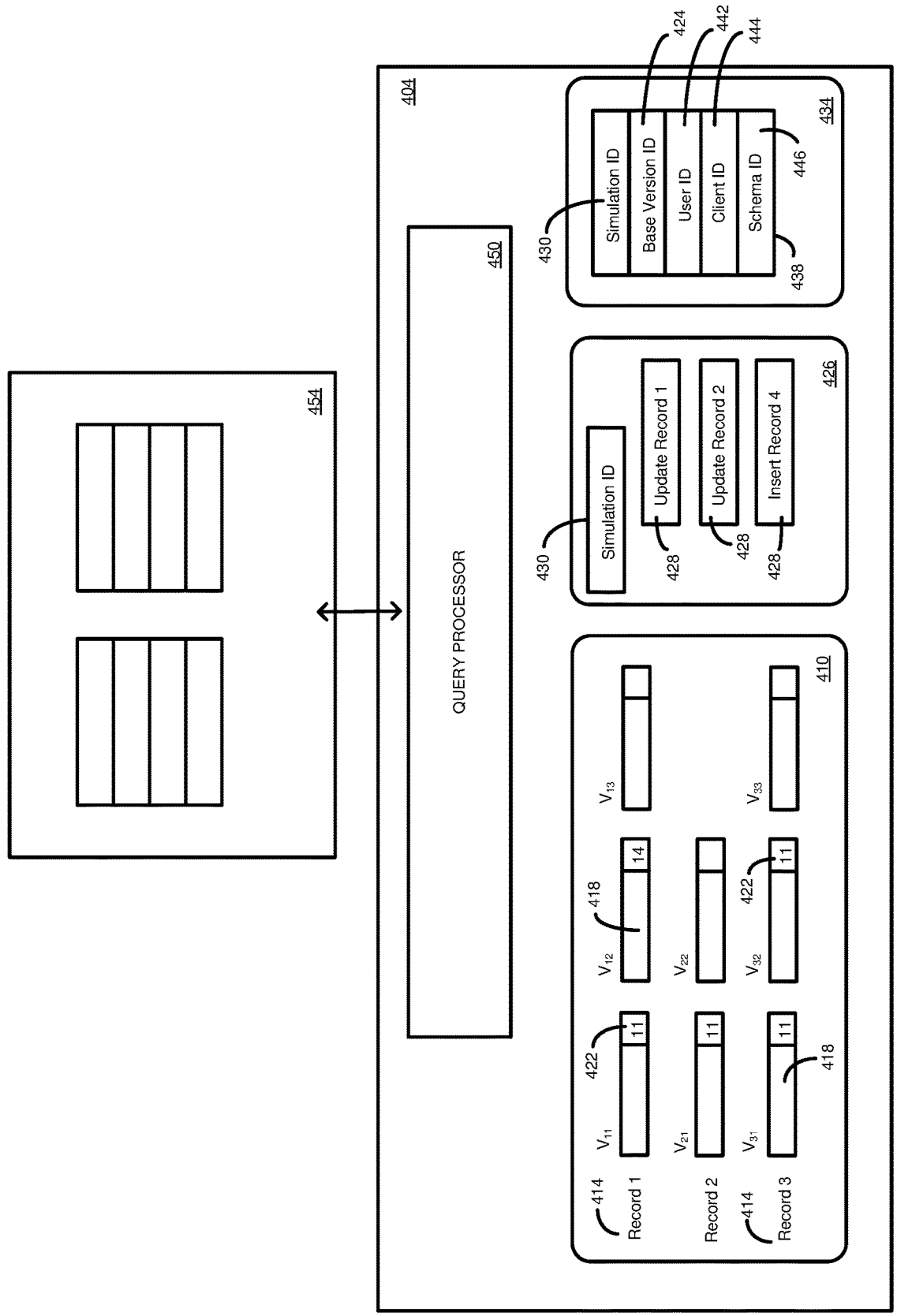
FIG. 4 is a diagram illustrating how a query processor may combine data from a primary data version store, a secondary data store, and a metadata store to execute a request simulation.

FIG. 4 illustrates how a primary data version table, such as the version table 310 of FIG. 3 or the version table 230 of FIG. 2, can be used to provide a simulation, according to an embodiment of the present disclosure. FIG. 4 illustrates a database system 404 having a primary data version table 410 that includes a plurality of records 414 and record versions 418. Each of the record versions 418 can be associated with a version identifier 422. When a simulation is initiated, the simulation can be assigned a base primary data version identifier 424 identifying record versions in the primary data version table 410 which should be used by the simulation. In some cases, the primary data base version identifier 424 can indicate a current time when the simulation was initiated. In other cases, the primary data base version identifier 424 can represent a past time. For example, a user may wish to perform simulations based on historical data, such as to determine potential effects of taking actions other than those that were actually taken.

A user can make changes to data in the primary data version table 410. However, rather than being stored in the primary data version table 410, the changes are stored in a secondary data store 426, such as in one or more tables. The secondary data store can correspond to the secondary data store 234 of FIG. 2. As shown, the secondary data store 426 includes secondary data 428 representing changes to the primary data associated with a particular simulation identifier 430.

The database system 404 can further include a metadata store 434, which may be the metadata store 238 of FIG. 2. The metadata store 434 can be structured as a table 438 including the simulation ID 430 as a primary key. For each primary key, the table 438 can include values for various parameters associated with the particular simulation identifier 430. For example, the table 438 can store the base primary data version identifier 424 associated with a particular simulation identifier 430. The table 438 can also include information such as a user ID 442 or a client identifier 444 associated with the simulation identifier 430, such as for access or authentication purposes. The table 438 can also include information associating the simulation associated with the simulation identifier 430 with a schema, such as using a schema ID 446. The schema ID 446 can be used, for example, to determine one or more database views of the data view engine 242 of FIG. 2 to use with the simulation, or other information relating to the presentation or manipulation of data from the secondary data store 426 and/or the primary data version store 410.

A query processor 450, which may correspond to the query processor 248 of FIG. 2, can merge data from the version store 410 and the secondary data store 426 to produce a simulation 454. In particular examples, the query processor 450 can combine, such as using SQL JOIN operations, data from the version table 410 and the secondary data store 426 to produce a simulation data set that includes all records from the version table 410 associated with the base primary data version identifier 424 of a simulation that have not been changed in the secondary data store 426. An example of suitable SQL operations to carry out this procedure are:

SELECT records for version ID 424
FROM version table 410
INNER JOIN with metadata data store 434 on base version ID
LEFT OUTER JOIN with secondary data store 426 on simulation ID and record ID
WHERE no suitable record was found in secondary data store 426
AS OF base primary data version identifier 424

Records relevant to a particular simulation ID 430 can be selected from the secondary store 426 using SQL operations, such as:

SELECT records for simulation ID 430
FROM secondary data store 426
WHERE simulation ID 430 is selected simulation ID The records selected from the version table 410 can be combined with the records in the secondary data store 426 to produce a simulation data set that can be used to produce the simulation 454, including using a data view of the data view engine 242 of FIG. 2.

As depicted in FIG. 1, a change to a value of a parameter of interrelated parameters associated with a simulation, or the definition of the interrelation, can affect one or more other parameters. This relationship is further depicted with reference to FIG. 5.

Figure 5:
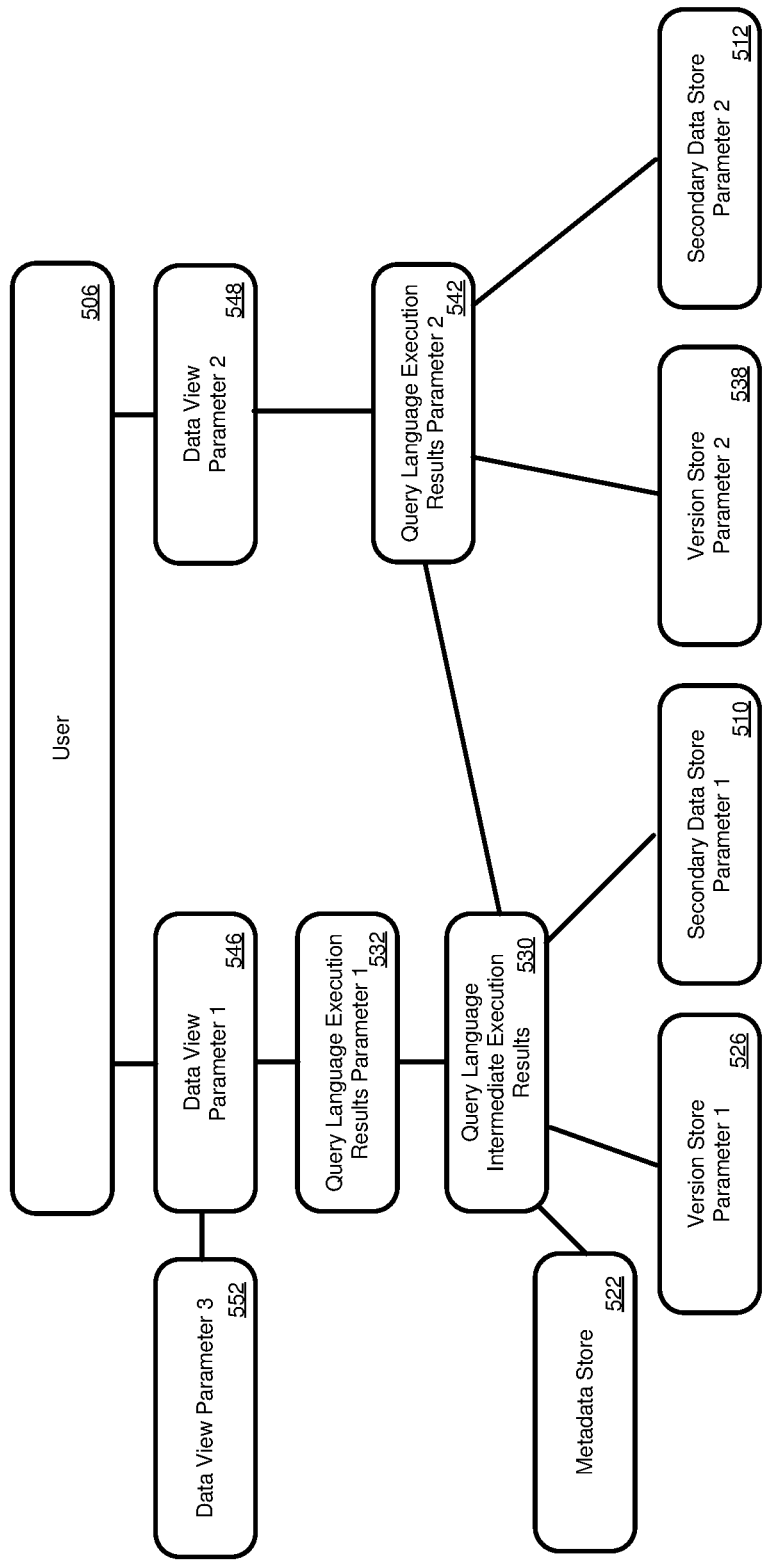
FIG. 5 is a diagram illustrating how a request simulation may be generated from multiple elements of a primary data version store and a secondary data store.

FIG. 5 depicts a simulation that includes changes to multiple interrelated parameters. A user 506 may make changes to one or more parameters, which can be stored in a secondary data store 510 for the first parameter and a secondary data store 512 for the second parameter. In at least some implementations, the secondary data stores 510 and 512 can be the same secondary data store (e.g., the version store 230 of FIG. 2, the version store 310 of FIG. 3, or the primary data version store 410 of FIG. 4). In some cases, the user 506 may explicitly change the values for the first and second parameters. In other cases, a change to one parameter can be calculated based on the change to the other parameter and a defined relationship between the first and second parameters. For example, if the first parameter is a request, and a second parameter is an input for the request, an increase in the number of requests to be fulfilled can decrease the amount of available inputs.

When the simulation is executed, in response to the execution of a first query language statement for the first parameter, a base primary data version identifier associated with the simulation (such as using a simulation identifier) can be retrieved from a metadata store 522 (e.g., the metadata store 238 of FIG. 2 or the metadata store 434 of FIG. 4). The primary data for the first parameter can be retrieved from a primary data version store 526 for parameter 1 and merged with the simulation data from the simulation store 510 to produce intermediate execution results 530 and execution results 532.

These intermediate execution results 530 can be accessed by a second query language statement for the second parameter. The query language statement can merge the intermediate execution results 530 with version data for the second parameter in a primary data version store 538 (which can be the same as the primary data version store 526) and the secondary data store 512 (which can be the same as the secondary data store 510) to produce second parameter execution results 542. Thus, changes to the first parameter can be propagated to the query for the second parameter. The execution results 532 and 542 can be passed through respective data views 546, 548 and displayed to the user 506.

The data views 546, 548 can be linked to other data views, such as a data view 552 for a third parameter. For example, changes to the number of orders, in addition to affecting the availability of inputs, may also affect the availability of outputs.

With reference again to FIG. 4, this Example 2 can allow multiple users to run simulations using a common primary data version table 410. The use of a common version table can reduce memory and processor use in a computing system providing for high numbers of simulations, as it does not require copying the entire primary data version table 410 (or even a portion relevant to a particular simulation) for each simulation or user. Rather, using the version identifiers 422, appropriate data can be selected from the primary data version table 410, including not selecting data from the version table that has been altered in a particular simulation or data that have been updated in the primary data version table after the start of a simulation. The only data that needs to be stored, in the secondary data store, is data specifically changed as part of the simulation, which is typically a much smaller volume of data than the entire primary data version table 410 (or the entire primary data store 226 of FIG. 2).

Figure 6A:
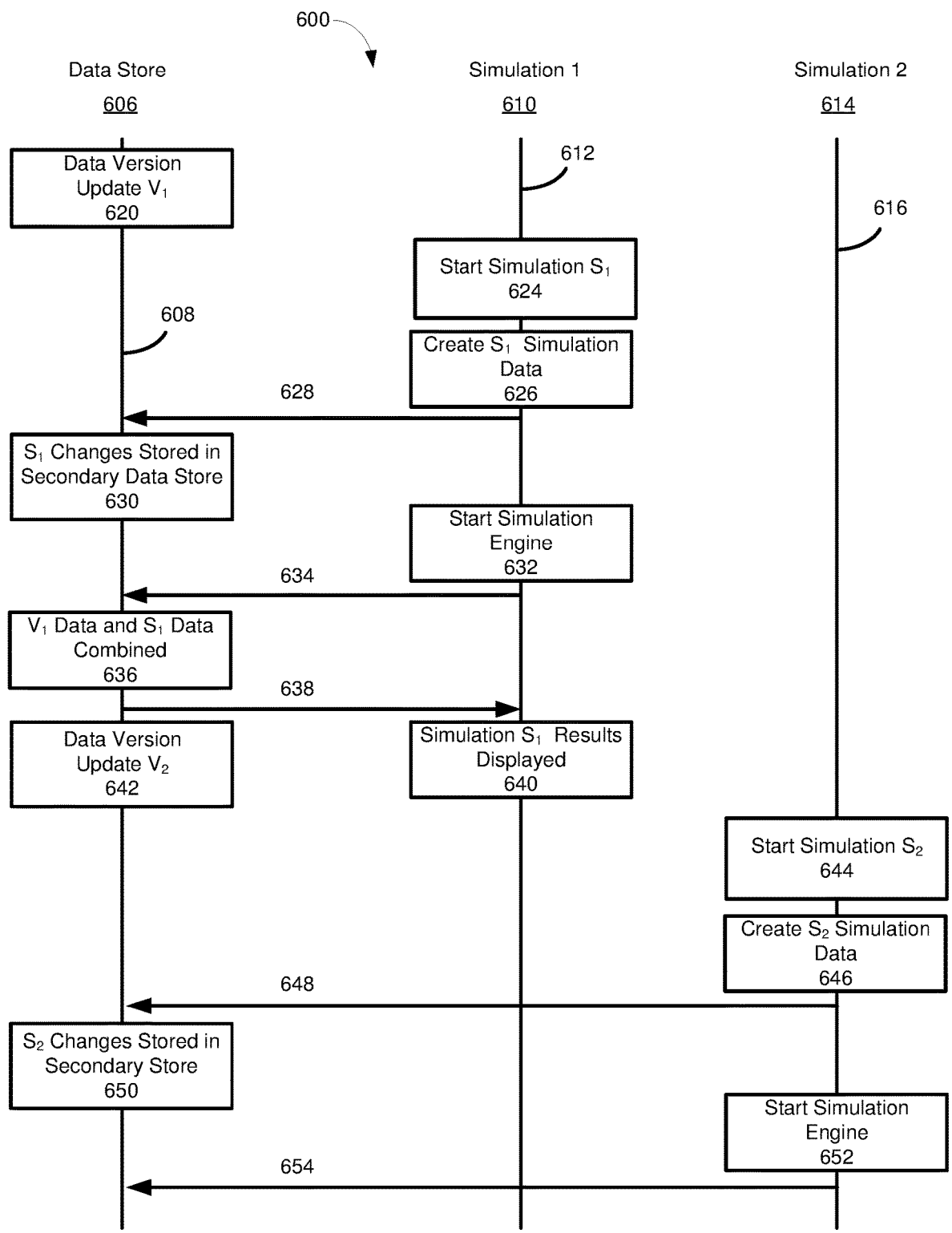
FIG. 6A is a diagram illustrating operations occurring at a data store, a first simulation, and a second simulation in executing request simulations.
Figure 6B:
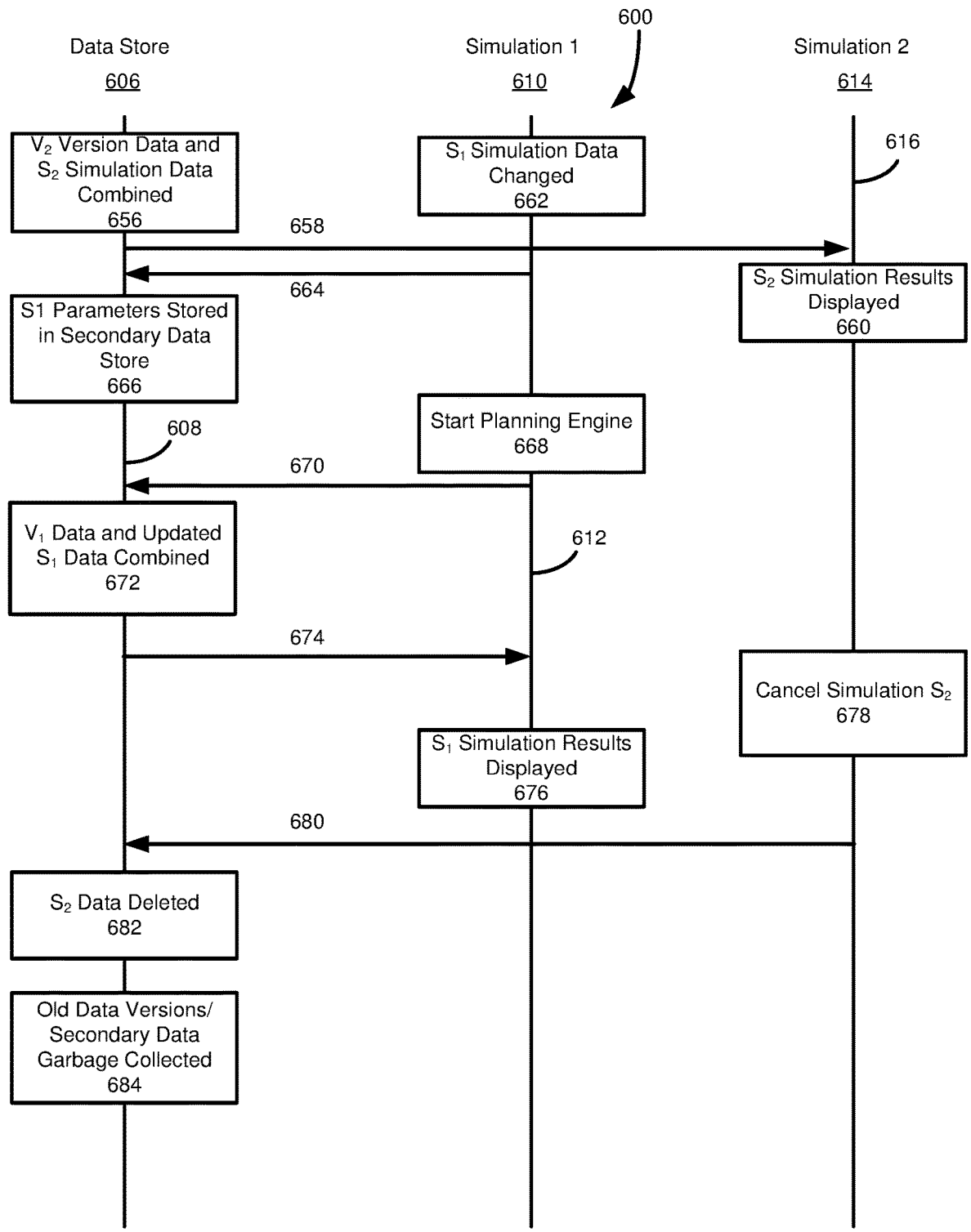
FIG. 6B is continuation of the diagram of FIG. 6A.

FIGS. 6A and 6B illustrate an example of how this Example 2 can provide for multiple simulations, including concurrent simulations and/or simulations by multiple users. FIGS. 6A and 6B illustrate action occurring at a data store 606 (e.g., the data store 222 of the database system 214 of FIG. 2), a first simulation 610 (such as by a first user), and a second simulation 614 (such as a simulation by a second user), having respective timelines 608, 612, 616. The data store 606, in some implementations, can include at least a primary data version store and a secondary data store. The primary data version store can periodically receive data updates from another data store, such as the primary data store 226 of FIG. 2.

In process 620, the primary data version store receives updated data from the primary data store. The primary data version store can mark any updates received in process 620 as being associated with a version identifier $V_1$. In process 624, a first simulation, $S_1$, is started at the first simulation 610, such as by a first user. The simulation $S_1$ is associated with a base primary data version identifier indicating that version $V_1$ of the primary data store should be used with the simulation $S_1$. In step 626, simulation data is created, such as by the first user, for simulation $S_1$. The simulation data is sent to the data store 606 in communication 628 and stored in the data store 606 (such as in the secondary data store) in step 630.

In block 632, a simulation engine, such as the simulation engine 258 of FIG. 2, is started for the first simulation 610. The simulation engine forwards appropriate requests for database operations, such as query language statements, to the data store 606 in communication 634. In process 636, the data store 606 combines appropriate version data for the version $V_1$ of the primary data associated with the simulation $S_1$ with the secondary data associated with $S_1$ and returns the results to the first simulation 610 in communication 638. The simulation is displayed, such as to the first user, in step 640.

In process 642, the primary data version store of the data store 606 is updated. Updated records in the primary data version store are associated with a version $V_2$. At this point, the primary data version store includes records for both version $V_1$ and version $V_2$ (for the purposes of this example, in at least certain implementations, the primary data version store may store more than two record versions). In step 644, a second simulation 614, $S_2$, is initiated, such as by a second user. Simulation $S_2$ is associated with a base primary data version identifier associating the simulation with the current version of data in the data store 606, version $V_2$. Simulation data for simulation $S_2$ is created, such as by the second user, in step 646. The simulation data is sent to the data store 606 in communication 648 and stored in the secondary data store of the data store in block 650.

The simulation engine for the second simulation 614 is started in block 652. The simulation engine forwards appropriate requests for database operations, such as query language statements, to the data store 606 in communication 654. With reference to FIG. 6B, the data store 606, in process 656, combines data from the version $V_2$ with the simulation data from simulation $S_2$ in the secondary data store to provide simulation data. In at least certain implementations, the data store 606 does not include simulation data from simulation $S_1$ stored in the secondary data store in producing simulation data for the simulation $S_2$.

In preparing the simulation data for the simulation $S_2$, the data store 606 does not include record versions associated with version $V_1$ from the primary data version store in the simulation data where the primary data version store also includes a record version $V_2$. That is, in at least some cases, the data store 606 selects only (at most) one version of a record, the record version being the version with highest record version identifier that is less than or equal to the base primary data version identifier of the simulation. In other cases, records can be marked or selected in another manner. For example, all records relevant to a particular version can be marked with that version number, even if the records are unchanged from a prior version. The simulation data is sent to the second simulation 614 in communication 658, and displayed in step 660.

In block 662 simulation data for simulation $S_1$ is updated, such as by the first user. For example, the results of the first simulation may have been unsatisfactory, or the first user may wish to consider the effect of further changes to the secondary data used for the simulation. The modified simulation data is sent to the data store 606 in communication 664 and stored in the secondary data store in step 666. The simulation engine for the first simulation 610 is started in step 668. The simulation engine forwards appropriate requests for database operations, such as query language statements, to the data store 606 in communication 670.

In process 672, the data store 606 combines the relevant primary data version (version $V_1$) with the updated simulation data $S_1$. Although the version store of the data store 606 has been updated to include data from version $V_2$, the version $V_2$ data is not used in producing the simulation data for the simulation $S_1$. Similarly, the data store 606 only uses data from the simulation $S_1$ of the first simulation 610 in producing the simulation data set for $S_1$, not the data from the simulation $S_2$ of the second simulation 614. The simulation data set for $S_1$ can be returned to the first simulation 610 in communication 674 and displayed in block 676.

A simulation can be cancelled or selected for deletion, such as depicted in step 678. In such cases, the relevant data in the secondary data store, in this case for simulation $S_2$, can be marked as deleted by sending a communication 680 to the data store 606, and can be deleted from the secondary data store of the data store in step 682.

In at least some aspects of the present disclosure, simulation data of the secondary data store and/or version data of the primary data version store can be periodically removed, such as in process 684. For example, data versions may be removed from the primary data version store if they are older than a certain date, have not or are not being used for a simulation, have not been accessed within a certain time period, or a combination thereof. In a particular example, data versions are removed if they are unused by a simulation or are used with a simulation that has not been accessed within a certain time period, and are older than a certain date.

The following example illustrates how data of particular version of primary data and secondary data associated with a simulation may be appropriately selected and displayed to a user for a particular simulation. At a point $T_0$, a version table includes values for items having primary keys of X, Y, and Z:

| Version Store | | | |
|---|---|---|---|
| Key | Attribute | Valid From | Valid To |
| X | 1 | $T_0$ | ? |
| Y | 1 | $T_0$ | ? |
| Z | 1 | $T_0$ | ? |

A user starts a simulation $S_1$ at a point $T_1$. A metadata store for simulations, such as metadata store 238 of FIG. 2, can associate $S_1$ with one or more parameters, including a base primary data version identifier for the simulation. At this point, the user has not made any changes to the data in the primary data version associated with the simulation. The following tables illustrate the secondary data store, the metadata store, and the data visible to $S_1$:

| Secondary Data Store | | | |
|---|---|---|---|
| Simulation ID | Key | Attribute | Method |

| Metadata Store | |
|---|---|
| Simulation ID | Version Identifier |
| 1 | $T_1$ |

| First User Simulation Data | |
|---|---|
| Key | Attribute |
| X | 1 |
| Y | 1 |
| Z | 1 |

At time $T_2$, the first user updates the attribute of X to 2. This change is recorded in the secondary data store, but not in the primary data version store. The secondary data store, and the data visible to the first user, at this point, are:

| Secondary Data Store | | | |
|---|---|---|---|
| Simulation ID | Key | Attribute | Method |
| 1 | X | 2 | Change |

| First User Simulation Data | |
|---|---|
| Key | Attribute |
| X | 2 |
| Y | 1 |
| Z | 1 |

Note that in the first user simulation data the attribute X has the value entered by the first user for the simulation, not the value in the primary data version store.

At time $T_3$, an update to the primary data version store occurs, such as from a primary data store, updating the attributes of primary keys X and Z, producing the following table:

| Version Store | | | |
|---|---|---|---|
| Key | Attribute | Valid From | Valid To |
| X | 2 | $T_0$ | $T_2$ |
| Y | 1 | $T_0$ | ? |
| Z | 1 | $T_0$ | $T_2$ |
| X | 9 | $T_{2.5}$ | ? |
| Z | 6 | $T_{2.5}$ | ? |

The primary keys X and Z having a "valid from" value of $T_0$ are now associated with a specified "valid to" value of $T_2$. So, any simulation having a base primary data version identifier $T_0$, $T_1$, or $T_2$ will see the attribute values from the $T_0$-$T_2$ version of primary keys X and Z. A simulation having a base primary data version identifier higher than $T_2$ will see the attributes values of X and Z valid from $T_{25}$ on. Again, the value of X associated with simulation $S_1$ is not reflected in the primary data version store.

At this point, the first user updates the attribute value of primary key X to 3. The secondary data store, the metadata store, and the data visible to the first user's simulation will be:

| Secondary Data Store | | | |
|---|---|---|---|
| Simulation ID | Key | Attribute | Method |
| 1 | X | 3 | Change |

| Metadata Store | |
|---|---|
| Simulation ID | Version Identifier |
| 1 | $T_1$ |

| First User Simulation Data | |
|---|---|
| Key | Attribute |
| X | 3 |
| Y | 1 |
| Z | 1 |

Note that the data visible to the first user includes the attribute value for X entered by the first user for the simulation $S_1$. Although the value of Z was updated in the primary data version store, the first user sees the attribute values corresponding to the simulation's version identifier ($T_1$), 1, rather than the most recent value of 6.

A time $T_4$, a second user creates a simulation $S_2$, which has a version identifier of $T_3$. The secondary data store, metadata store, and data visible to the second user are:

| Secondary Data Store | | | |
|---|---|---|---|
| Simulation ID | Key | Attribute | Method |
| 1 | X | 3 | Change |

| Metadata Store | |
|---|---|
| Simulation ID | Version Identifier |
| 1 | $T_1$ |
| 2 | $T_3$ |

| Second User Simulation Data | |
|---|---|
| Key | Attribute |
| X | 9 |
| Y | 1 |
| Z | 6 |

At time $T_5$, the second user changes the attribute value of X to 4. The states of the secondary data store, metadata store, and data visible to $S_2$ are:

| Secondary Data Store | | | |
|---|---|---|---|
| Simulation ID | Key | Attribute | Method |
| 1 | X | 3 | Change |
| 2 | X | 4 | Change |

| Metadata Store | |
|---|---|
| Simulation ID | Version Identifier |
| 1 | $T_1$ |
| 2 | $T_3$ |

| Second User Simulation Data | |
|---|---|
| Key | Attribute |
| X | 4 |
| Y | 1 |
| Z | 6 |

Finally, at time $T_6$, the first user adds primary key W to the secondary data associated with the simulation $S_1$. The secondary store, metadata store, and data visible to the first and second users is:

| Secondary Data Store | | | |
|---|---|---|---|
| Simulation ID | Key | Attribute | Method |
| 1 | X | 3 | Change |
| 2 | X | 4 | Change |
| 1 | W | 7 | New |

| Metadata Store | |
|---|---|
| Simulation ID | Version Identifier |
| 1 | $T_1$ |
| 2 | $T_3$ |

| First User Simulation Data | |
| --- | --- |
| Key | Attribute |
| W | 7 |
| X | 3 |
| Y | 1 |
| Z | 1 |

| Second User Simulation Data | |
| --- | --- |
| Key | Attribute |
| X | 4 |
| Y | 1 |
| Z | 6 |

This Example 2 can include additional features. In at least some implementations, a user can select to alter the base primary data version identifier associated with a simulation. For example, the user may wish to investigate whether a particular scenario is the same or similar using a newer data version. However, the user could also change the version identifier to an older data version.

In at least some cases, conflicts might arise between the secondary data associated with a simulation and the data associated with a new base data version identifier. Using the example described above, a first primary data version may have an attribute value of 2 for X and the secondary data store for the simulation may have an attribute value of 4 for X. A second version of primary data may have an attribute value of 6 for X. If the base primary data version identifier for the simulation is changed to the second data version, a conflict may arise in determining whether to use 4 or 6 as the value of X. In at least certain implementations, such conflicts can be resolved by selecting the secondary data to be used for the simulation. In other cases, another rule can be used to resolve conflicts, or the user can be asked to manually resolve conflicts.

In some implementations, a user can select to merge changes of a first simulation with a second simulation. Conflicts can be handled in a similar manner as described above, where a conflict resolution rule can be defined or a user can manually resolve conflicts.

As another feature, in some implementations, a user may select to merge changes made in their simulation with a primary data store, such as the primary data store 226 of FIG. 2. In some cases, the application 254 can interface with the primary data store 226, or another component in communication with the primary data store. For example, commands to make the necessary updates to the primary data store 226 can be scripted by the application 254 and sent for execution to a database application, such as an ERP application.

In the event conflicts arise between the primary data store 226 and the secondary data associated with the simulation (such as changes to the primary data in the primary data store 226 that occurred after the data version specified by the base primary data version identifier of the simulation), the update can be blocked, rules may be defined to resolve conflicts (such as overwriting the primary data with the simulation data), or the user may be asked to manually resolve conflicts. In another aspect, the application 254 may display a list of actions a user should take to update the data in the primary data store 226 to reflect the simulation. The user may then manually access the primary data store 226 to make appropriate changes to the data.

Figure 7:
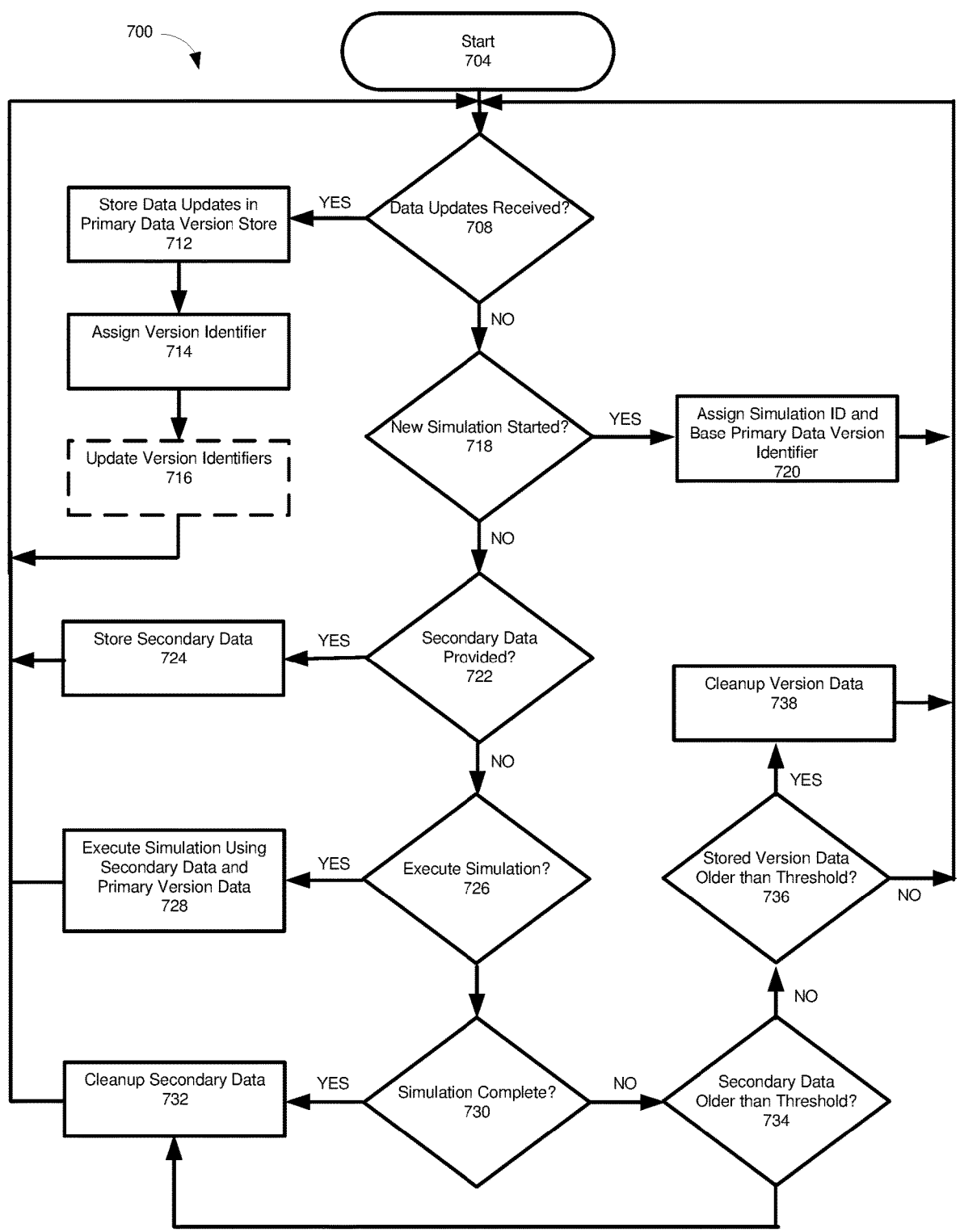
FIG. 7 is a flowchart of an example method for storing primary data versions, storing secondary data, and executing queries.

FIG. 7 illustrates a method 700 according to an embodiment of the present disclosure. Although the components of the method 700 are described as occurring in a particular order, it should be appreciated that the components of the method 700 can be executed in alternative orders. In addition, certain steps may be omitted from the method 700, and other steps may be included. Components shown as sequential can, in at least some cases, be performed in parallel.

The method begins at step 704. In decision 708, the method 700 determines whether an update from a primary data store has occurred or has been received. If so, an updated data version can be stored in a primary data version store in step 712. In some cases, step 712 may be omitted. For example, in some implementations, the primary data store can also serve as the primary data version store.

In step 714, a version identifier is associated with the primary data version stored in step 712. In optional step 716, version identifiers for other data versions stored in the primary data version store may be updated. For example, in some cases, a version identifier may include an indicator of when the data version is valid from and an indicator of when the data version is valid to. In more particular examples, a "valid from" identifier can be assigned when the data version is stored in the primary data version store. The "valid to" identifier can be assigned when the next data version for a particular record is received by the primary data version store. In some cases, after execution of step 716, the method 700 can return to decision 708. However, the method can return to another component of the method.

In decision 718, the method 700 determines whether a new simulation has been started. If a new simulation has been started, in step 720, the method 700 can assign a simulation identifier to the simulation. In step 720, the method 700 can also assign a base primary data version identifier to the simulation. The base primary data version identifier can indicate version data in the primary data version store which should be used in executing the simulation. The method 700 can return to decision 708 or another component of the method.

In decision 722, the method 700 determines whether data for a simulation has been created. If data for a simulation has been created, the data can be stored in a secondary data store in step 724. In the secondary data store, the data can be associated with an identifier for the simulation. The method 700 can return to decision 708 or another component of the method.

In decision 726, the method 700 can determine whether a simulation should be executed. If it has been indicated, such as by as user, that a simulation it is to be executed, in step 728, the method 700 can execute the simulation using data from the version store associated with the base primary data version identifier for the simulation and the data in the secondary data store associated with the simulation. The method 700 can return to decision 708 or another component of the method.

Decision 730 can determine whether the simulation is complete, such as in response to user input. If a simulation has been completed, in at least some aspects, secondary data for the simulation can be removed from secondary data store in step 732. In some cases, the method 700 can also determine whether version data used by the simulation can be removed from the primary data version store (and, if so, remove the version data from the primary data version store). The method 700 can return to decision 708 or another component of the method.

In decision 734, the method 700 can determine whether secondary data, such as secondary data in the secondary data store, can be removed. In a particular implementation, the determining can include determining whether the secondary data has been accessed within a threshold period of time, or is older than a certain time. If the determining indicates that the secondary data should be deleted, the secondary data can be removed from the secondary data store in step 732. The method 700 can return to decision 708 or another component of the method.

In at least some implementations, in decision 736, the method 700 can determine whether version data of the primary data version store can be deleted from the primary data version store. For example, the data version identifier can be compared with a threshold value and deleted if appropriate based on the relationship of the data version identifier to the threshold value, such as the data version identifier being less than the threshold value. If the comparing indicates that the version data should be removed from the primary data version store, the version data can be deleted in step 738. The method 700 can return to decision 708 or another component of the method.

Example 3—Computing Systems

Figure 8:
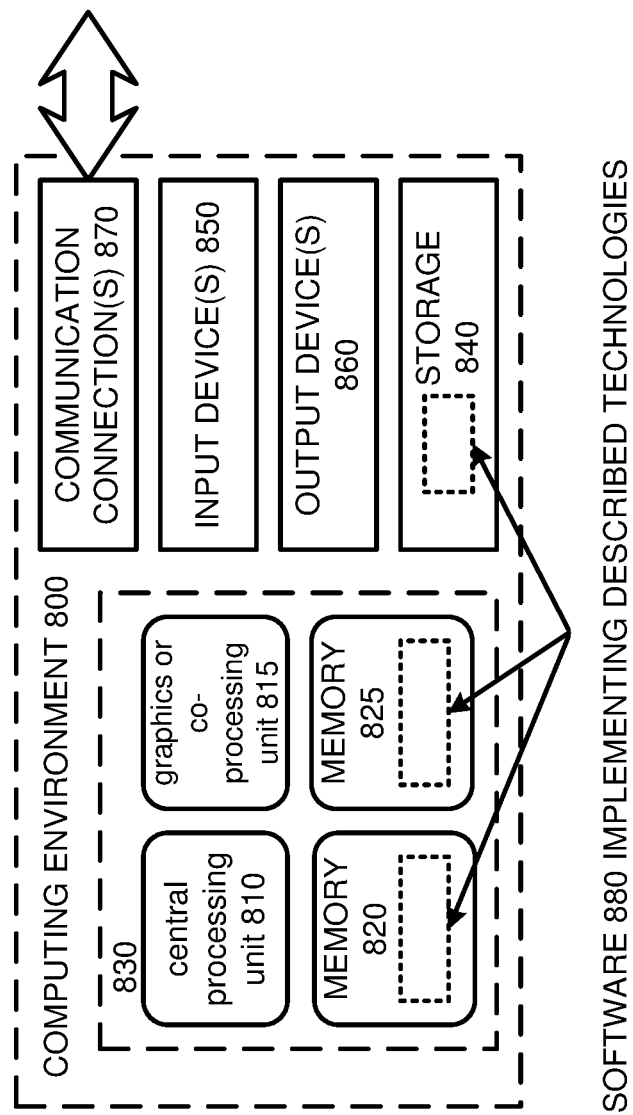
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing a database environment, and associated methods, described in Examples 1 and 2. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store database data, such as data associated with the data store 222 of FIG. 2.

A computing system 800 may have additional features. For example, the computing system 800 includes storage 840 (such as for storing data of the data store 222), one or more input devices 850, one or more output devices 860, and one or more communication connections 870, including input devices, output devices, and communication connections for interacting with a user, such as through the user interface 262 of FIG. 2. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 4—Cloud Computing Environment

Figure 9:
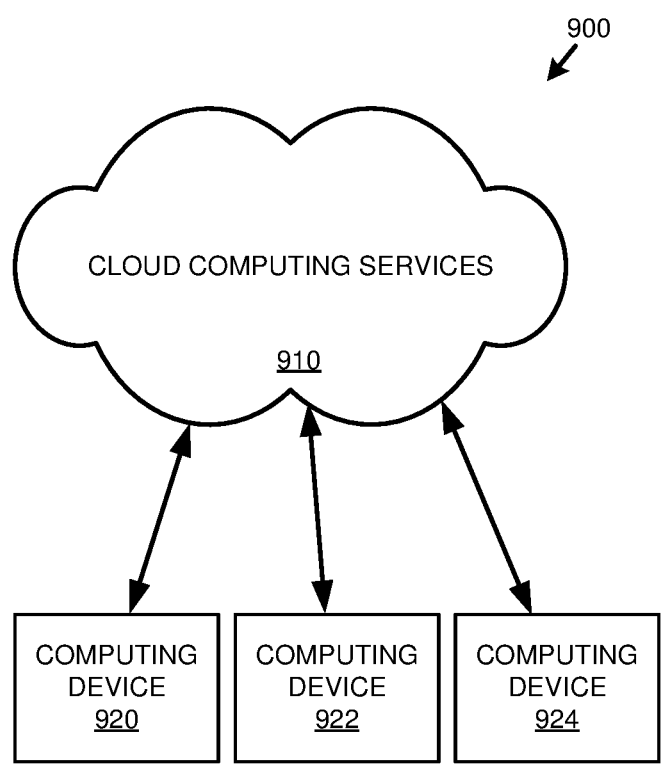
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 5—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media comprising:
    computer-executable instructions that, when executed by a computing system, cause the computing system to store a first version of primary data as a first plurality of first versions of database records for a first set of one or more database tables in a primary data version store, the primary data version store storing different versions for a second plurality of database records, the second plurality of database records comprising the first plurality of database records, and wherein different versions of a given database record have at least one value of the given database record that is different between the versions;
    computer-executable instructions that, when executed by the computing system, cause the computing system to store a second version of primary data as a third plurality of second versions of at least a portion of the first plurality of database records in the primary data version store, the second plurality of database records comprising the third plurality of database records;
    computer-executable instructions that, when executed by the computing system, cause the computing system to receive a command to begin a data simulation, wherein the data simulation is configured to receive one or more changes to one or more tables of the first set of one or more tables in the primary data version store and to store the one or more changes in a simulation table set, being a second set of one or more database tables, wherein tables of the second set of one or more database tables are not in the first set of one or more database tables;

computer-executable instructions that, when executed by the computing system, cause the computing system to receive first secondary data specified as being for the data simulation, the first secondary data comprising a third version of at least a portion of the second plurality of database records;

computer-executable instructions that, when executed by the computing system, cause the computing system to store the first secondary data in the simulation table set;

computer-executable instructions that, when executed by the computing system, cause the computing system to receive a first query language statement in a database query language, the first query language statement, wherein the first query language statement is specified to use one or more tables of the simulation table set; and computer-executable instructions that, when executed by the computing system, cause the computing system to execute the first query language statement by:
  determining that at least a portion of a first record responsive to the first query language statement is present in the first secondary data;
  using a third version of the at least a portion of the first record for the query rather than a first version or a second version of the at least a portion of the first record;
  determining that at least a portion of a second record responsive to the first query language statement is not present in the first secondary data; and
  using a first version or a second version of the at least a portion of the second record for the first query language statement.

2. The one or more computer-readable storage media of claim 1, further comprising:
  computer-executable instructions that, when executed by the computing system, cause the computing system to associate the first version of primary data with a first version identifier;
  computer-executable instructions that, when executed by the computing system, cause the computing system to associate the second version of primary data with a second version identifier;
  computer-executable instructions that, when executed by the computing system, cause the computing system to associate a first secondary data identifier with the first secondary data; and
  computer-executable instructions that, when executed by the computing system, cause the computing system to associate a first base primary data version identifier with the first secondary data identifier, the first base primary data version identifier associated with the first version of primary data;
  wherein the first query language statement comprises the first secondary data identifier, and wherein, for the executing the first query language statement, the first base primary data version identifier indicates data elements of the primary data version store to be analyzed in executing the first query language statement.

3. The one or more computer-readable storage media of claim 2, further comprising:
  computer-executable instructions that, when executed by the computing system, cause the computing system to store the association between the first base primary data version identifier and the first secondary data identifier in a metadata store.

4. The one or more computer-readable storage media of claim 1, further comprising:
  computer-executable instructions that, when executed by the computing system, cause the computing system to receive second secondary data;
  computer-executable instructions that, when executed by the computing system, cause the computing system to associate a second secondary data identifier with the second secondary data;
  computer-executable instructions that, when executed by the computing system, cause the computing system to associate a second base primary data version identifier with the second secondary data identifier, the second base primary data version identifier indicating the first version of primary data or the second version of primary data;
  computer-executable instructions that, when executed by the computing system, cause the computing system to store the second secondary data in the secondary data store.

5. The one or more computer-readable storage media of claim 4, further comprising:
  computer-executable instructions that, when executed by the computing system, cause the computing system to receive a second query language statement, the second query language statement associated with the second secondary data identifier; and
  computer-executable instructions that, when executed by the computing system, cause the computing system to execute the second query language statement, wherein the executing comprises selecting query results from a data set comprising the second secondary data and data elements of the version of primary data indicated by the second base primary data version identifier that are not inconsistent with the second secondary data.

6. The one or more computer-readable storage media of claim 1, further comprising:
  computer-executable instructions that, when executed by the computing system, cause the computing system to define at least one JOIN operation between one or more database tables the first set of one or more database tables and one or more database tables of the simulation table set.

7. The one or more computer-readable storage media of claim 1, further comprising:
  computer-executable instructions that, when executed by the computing system, cause the computing system to associate the first version of primary data with a first version identifier; and
  computer-executable instructions that, when executed by the computing system, cause the computing system to store the first version identifier with the first version of primary data in the primary data version store.

8. The one or more computer-readable storage media of claim 1, further comprising:
  computer-executable instructions that, when executed by the computing system, cause the computing system to associate the first version of primary data with a first version identifier;
  computer-executable instructions that, when executed by the computing system, cause the computing system to compare the first version identifier with a threshold value; and computer-executable instructions that, when executed by the computing system, cause the computing system to delete the first version of primary data from the primary data version store if the first version identifier is less than the threshold value.

9. The one or more computer-readable storage media of claim 1, wherein executing that first query language statement comprises determining primary key values of the first secondary data and not selecting for the data set data of the first version of primary data having the primary key values.

10. The one or more computer-readable storage media of claim 1, further comprising:
computer-executable instructions that, when executed by the computing system, cause the computing system to receive a second query language statement, the second query language statement not being specified to use the one or more tables of the simulation table set; and
computer-executable instructions that, when executed by the computing system, cause the computing system to execute the second query language statement using the first version of primary data or the second version of primary data.

11. The one or more computer-readable storage media of claim 10, wherein the first query language statement and the second query language statement are at least in part concurrently executed.

12. The one or more computer-readable storage media of claim 10, wherein the first versions of database records are part of an enterprise resource planning system.

13. A computing system that implements a data processing service, the computing system comprising:
at least one memory;
one or more processing units coupled to the at least one memory; and
one or more computer readable storage media storing instructions that, when loaded into the at least one memory, cause the one or more processing units to perform operations for:
receiving first version data for a plurality of data records stored in a first set of one or more database tables;
storing the first version data in a version data store;
receiving first secondary data corresponding to second version data for at least a first portion of the plurality of data records;
storing the first secondary data in a secondary data store comprising a second set of one or more database tables, database tables of the first set not being in the second set;
receiving a data processing request from a client, the data processing request specifying at least one database table of the first set and at least one database table of the second set; and
with at least one of the one or more processing units, selecting request results from a data set by:
determining that at least a portion of a first record responsive to the data processing request is present in the second set of database tables;
using first secondary data of the at least a portion of the first record for the data processing request rather first version data of the at least a portion of the first record;
determining that at least a portion of a second record responsive to the data processing request is not present in the second set of database tables; and
using first version data of the at least a portion of the second record for the data processing request.

14. The computing system of claim 13, wherein the operations further comprise:
receiving second version data, the second version data comprising second version data for at least a second portion of the plurality of data records;
associating the first version data with a first version identifier;
associating the second version data with a second version identifier;
associating a first secondary data identifier with the first secondary data; and
associating a base data version identifier with the first secondary data identifier, the base data version identifier associated with the first version data;
wherein the data processing request is associated with the first secondary data identifier, and wherein, for the selecting request results, the base data version identifier indicates data elements of the second version data.

15. The computing system of claim 14, wherein the operations further comprise:
storing the association between the base data version identifier and the first secondary data identifier in a metadata store.

16. A method, implemented in a computing system comprising a memory and one or more processors, the method comprising:
storing a first version of primary data and a first version identifier associated with the first version of primary data in a primary data version store, the first version of primary data comprising data for a first set of one or more data collections, wherein a data collection comprises one or more data elements;
receiving a first set of one or more changes to one or more data collections of the first set;
storing the one or more changes of the first set of one or more changes as a second version of the primary data and a second version identifier associated with the second version of the primary data in the first set of one or more data collections;
receiving a simulation request, the simulation request comprising a simulation identifier;
determining a base primary data version identifier associated with the simulation identifier;
receiving a second set of one or more changes to one or more data collections of the first set, the second set of one or more changes being specified for a simulation identified by the simulation identifier;
storing the one or more changes of the second set of one or more changes in a second set of one or more data collections, wherein data collections of the first set of one or more data collections are not in the second set of one or more data collections;
receiving a request for simulation results to be retrieved from the first set of one or more data collections and the second set of one or more data collections;
forming a data set by:
determining that at least a portion of a first data element responsive to the request is present in the second set;
using the at least a portion of the first data element of the second set for the request rather than the at least a portion of the first data element of the first set;
determining that at least a portion of a second data element responsive to the request is not present in the second set; and
using the at least a portion of the second data element in the first set for the request.

17. The method of claim 16, wherein determining simulation results comprises comparing a primary key value of data elements of the second set to a primary key value of data elements of the primary data version store, wherein data of the primary data version store having a primary key value corresponding to the primary key value of data elements of the second set are not included in the data set.

18. The method of claim 16, wherein the first version identifier comprises an indicator indicating a time that data is valid from.

19. The method of claim 18, wherein the first version identifier further comprises an indicator indicating a time that data is valid to.

20. The method of claim 16, wherein the first version identifier comprises an indicator indicating a time that data is valid to.

* * * * *